United States Patent [19]

Williams et al.

[11] Patent Number: 4,518,191
[45] Date of Patent: May 21, 1985

[54] AIR CURRENT DEFLECTOR SHIELD AND BRACKET COMBINATION

[75] Inventors: Robert D. Williams, Des Moines; James Mastin, Corydon, both of Iowa

[73] Assignee: Deflecta-Shield Corporation, Corydon, Iowa

[21] Appl. No.: 351,184

[22] Filed: Feb. 22, 1982

[51] Int. Cl.³ .............................................. B60J 1/20
[52] U.S. Cl. .................................. 296/91; 248/223.4; 248/218; 16/225; 180/686
[58] Field of Search .................. 296/15, 91, 95 Q; 180/68 P, 68.6; 280/502; 16/225, DIG. 13; 403/21; 248/295.1, 298, 223.3, 223.4, 73; 411/84, 85

[56] References Cited

U.S. PATENT DOCUMENTS

| 2,335,896 | 12/1943 | Anderson | 248/295.1 |
|---|---|---|---|
| 2,938,739 | 5/1960 | Puccio | 280/502 |
| 3,010,754 | 11/1961 | Shumaker | 296/91 |
| 3,015,517 | 1/1962 | Thornburgh | 296/91 |
| 3,427,067 | 2/1969 | Kish | 296/91 |
| 3,456,706 | 7/1969 | Ollis, Jr. | 411/84 |
| 3,483,910 | 12/1969 | La Londe et al. | 411/84 |
| 3,754,300 | 8/1973 | Shepherd | 16/225 |
| 3,799,603 | 3/1974 | Bott | 296/91 |
| 4,153,129 | 5/1979 | Redmond | 296/91 |
| 4,236,592 | 12/1980 | Ziegler | 296/91 |
| 4,340,198 | 7/1982 | Meinunger | 248/225.1 |
| 4,364,596 | 12/1982 | Geisendorfer | 296/91 |

Primary Examiner—David A. Scherbel
Assistant Examiner—Dennis H. Pedder
Attorney, Agent, or Firm—Zarley, McKee, Thomte, Voorhees & Sease

[57] ABSTRACT

An air current deflector shield with an improved shield gripping bracket is disclosed. The shield member comprises a single piece of unbroken transparent material which is received into an elongated rigid bracket having forward walls, a bottom wall and a rearward wall which define a shield receiving channel. Below the bottom wall is a means for adjustably receiving securing straps which allow the straps when not secured, to be moved at will along the longitudinal axis of the bracket, providing for complete adjustability as to where the attaching straps are connected to the forward grill and/or hood portion of an automobile.

4 Claims, 3 Drawing Figures

U.S. Patent    May 21, 1985    4,518,191
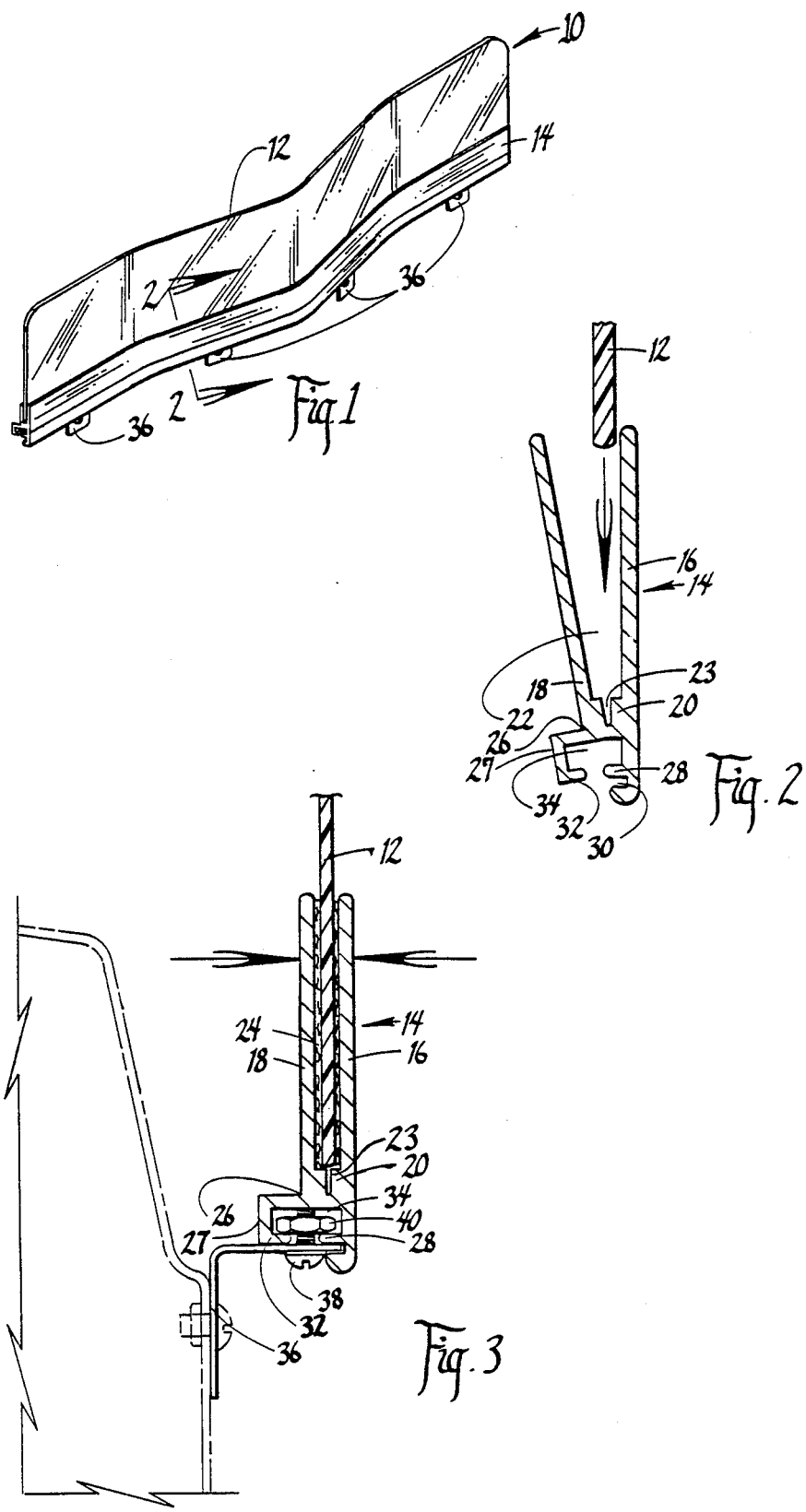

AIR CURRENT DEFLECTOR SHIELD AND BRACKET COMBINATION

BACKGROUND OF THE INVENTION

This invention relates to deflector shields and particularly to air current deflector shields for automobiles. It represents an improvement over the air current deflector shield and bracket described in U.S. Pat. No. 4,153,129 which is commonly owned with the present application.

Air current deflector shields are known to provide advantages to automobiles from the standpoint of streamlining the air flow and reducing the drag about the automobile as it travels. They are also equally advantageous to deflect air flow patterns up and away from the windshield of an automobile.

It goes without saying that as an automobile travels down the road, the deflector shield is subjected to considerable pressure, since it is being constantly impacted with air. There is, therefore, a real need for a deflector shield which provides for good lateral rigidity. That is to say, one which will not eventually wobble from side to side after use for some period of time. Many of the prior deflector shields sold have this weakness. It is a primary object of the present invention to overcome this weakness and provide a deflector shield which has good lateral rigidity.

Another problem which commonly occurs with deflector shields is that because of the wide variety of automobiles made, they must be made in a number of different bracket sizes and shapes to allow attaching along different locations to different automobiles. The present improved bracket allows the unit to adjust to an enormous number of situations by simply providing for complete sliding adjustability of the shield attaching straps. It is therefore another primary objective of the present invention to provide a deflector shield bracket which allows complete adjustment of the attaching straps for convenient location on a variety of different automobiles.

Another objective of the present invention is to provide in combination with the above objective, a deflector shield bracket which allows for easy opening and insertion of the shield, followed by an inward squeezing pressure which distorts the bracket walls inwardly to provide a constant gripping tension on the shield.

An even further object of the present invention is to provide each of the above objectives in a simple, convenient, easy to make bracket which is inexpensive to make and refined in appearance.

BRIEF DESCRIPTION OF THE DRAWINGS

FIG. 1 is a perspective view of the invention.

FIG. 2 is an enlarged exploded side view seen along line 2—2 of FIG. 1, and showing the shield as it is being inserted, with the bracket walls flexed open.

FIG. 3 is a view similar to FIG. 2, showing the bracket attaching strap in position and showing the shield inserted and bonded in the bracket.

DETAILED DESCRIPTION OF THE INVENTION

The numeral 10 refers generally to the air current deflector shield device shown in FIG. 1.

Deflector shield device 10 is comprised of a shield member 12, which is a single unbroken piece of transparent material, preferably of the thermo plastic polymer type such as those produced under the tradenames "Plexiglass", "Lucite" and "Acrylic".

The numeral 14 refers to the bracket generally. Bracket 14 has a forward wall 16 and a rearward wall 18 and a bottom wall 20. Forward wall 16, rearward wall 18 and bottom wall 20 define a channel 22 for receipt of shield member 12.

Bottom wall 20 has an elongated longitudinal slit 23, which allows the front and rearward walls to be flexibly distorted open as shown in FIG. 2, and conversely, when squeezing pressure is applied in an inward direction on the walls, distorted inwardly to provide a constant inward urging and gripping against shield member 12 as depicted in FIG. 3.

Prior to insertion of shield member 12, the inner surfaces of front, rear and bottom walls 16, 18 and 20, respectively, are covered with an adhesive material 24, which will not be described further, since the specific adhesive forms no part of the present invention. Adhesive material 24 aids in binding bracket 14 to shield member 12.

With continuing reference to FIGS. 2 and 3, and with particular reference to FIG. 3, rearward wall 18 extends downwardly below bottom 20 and terminates in shoulder 26, with the bracket thereafter extending at right angles to rear wall 18, then again making another right angle, and yet then another to define a U-shaped rail portion 27. Similarly, front wall 16 extends on downwardly beyond bottom 20 with an inwardly extending shoulder 28, and below that, just prior to the termination of the wall extension portion, but below shoulder 28 is an elongated strap receiving slot 30 extending along the length bracket 14.

For purposes of description herein, U-shaped rail portion 27 will be described as having a shoulder portion 32 and the bolt-receiving channel defined by U-shaped rail portion 26, its shoulder portion 32, and forward wall extension shoulder portion 28 will be defined as channel 34. Channel 34 extends along the length of bracket 14.

Looking particularly at FIGS. 1 and 3, it can be seen that a plurality of attaching straps 36 can be slipped into slot 30 and slid at will along the longitudinal axis of the bracket. When the strap 36 is located at the precise point desired for attachment to the vehicle bolt 38 and nut 40 may be attached to securely hold strap 36 in attached relationship to bracket 14.

Because strap 36 is rigidly secured against both shoulders 28 and 32, as well as lodged securely in slot 30, the strength of the gripping is excellent. The rigidity of the deflector shield is good and it resists stresses excellently with a noted absence of any lateral wobbling.

Slit 23 in bottom wall 20 provides a convenient and much improved assembly technique for the device. Walls 16 and 18 may be flexed outwardly and the shield member 12 inserted as indicated by the directional arrow in FIG. 2. The walls easily deflect outwardly because of slit 23. Having the walls deflect outwardly to open as shown in FIG. 2, also allows easy smearing of adhesive 24 on the inner surfaces of the forward, rear and bottom walls. Thereafter, once the adhesive 24 is added, and the shield 12 inserted, the walls are then squeezed inwardly as indicated by the directional arrows of FIG. 3, to provide a constant inward gripping pressure against the shield 12.

It therefore can be seen that the invention accomplishes at least all of its stated objectives in that a versatile shield holding bracket is provided which is durable, prevents lateral wobbling, allows the shield to be effectively and easily inserted and thereafter gripped, and which provides for substantially increased versatility in that the bracket attaching straps may be moved at will along the full length of the bracket and secured at the point most convenient for any automobile. This, of course, increases dramatically the versatility of the shield. All of these advantages and objectives are obtained with a device which is still simple to make, refined in appearance and easy in use and installation.

What is claimed is:

1. An air current deflector shield, comprising:
   a shield member of a single piece of unbroken transparent material;
   an elongated bracket having a shield receiving channel, and a securing strap receiving means for adjustable receipt of securing straps;
   said shield receiving channel being defined by a forward wall, a bottom wall, and a rearward wall, said bottom wall having a longitudinal slit along its length to allow said forward and rearward walls to be spread open for easy insertion of said shield member, and following closing pressure on each wall to allow said forward and rearward walls to be folded inwardly to provide gripping pressure on said shield member; and
   said securing strap receiving means comprising a bolt-receiving T-shaped channel associated with said bottom wall of said bracket extending along the length of said bracket, and a strap receiving slot extending along the length of said bracket below said bolt-receiving channel, the bolt-receiving T-shaped channel being defined by a top wall, two downwardly extending spaced-apart front and back walls, and inwardly extending shoulders from the bottom of said front and back walls to form a T-shape in cross-section channel extending the length of said bracket with a downwardly facing slot running therealong, and said strap receiving slot being defined by said shoulder of said front downwardly extending walls of said bolt-receiving channel, a front wall extending downwardly from said front wall of said bolt-receiving channel, and a bottom wall extending rearwardly from the bottom end of said front wall of said strap receiving slot.

2. The device of claim 1 wherein said deflector shield further comprises securing straps which are adjustably securable at one end along the length of said strap receiving means, and which are securable at their opposite ends to a vehicle.

3. The device of claim 2 wherein said securing straps extend into said strap receiving slot and have bolt means extending through said straps upwardly into said bolt-receiving channel, said bolt means having nut means within said bolt-receiving channel which, when threadably mated with said bolt means retains said bolt means along said bolt-receiving channel and therefore retains said securing straps along said bolt-receiving channel.

4. The device of claim 3 wherein when said bolt means is tightened, said straps are abuttingly held against said strap receiving means and securely held within said strap-receiving slot so that forward or rearward movement or bending of said shield member is prevented.

* * * * *